(12) United States Patent
Eun et al.

(10) Patent No.: US 6,850,823 B2
(45) Date of Patent: Feb. 1, 2005

(54) SYSTEM AND METHOD FOR EXECUTING DIAGNOSIS OF VEHICLE PERFORMANCE

(75) Inventors: Jong-Won Eun, Daejeon (KR); Seong-Pal Lee, Daejeon (KR); Cheol-Oh Jeong, Daejeon (KR); Jae-Woo Park, Daejeon (KR); Cheon-Sig Sin, Daejeon (KR); Moon-Hee You, Daejeon (KR); Dae-In Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 245 days.

(21) Appl. No.: 10/119,829

(22) Filed: Apr. 11, 2002

(65) Prior Publication Data

US 2003/0107548 A1 Jun. 12, 2003

(30) Foreign Application Priority Data

Dec. 8, 2001 (KR) ......................................... 2001-77599

(51) Int. Cl.[7] .......................... G06F 17/00; G08G 1/127
(52) U.S. Cl. ............................ 701/29; 701/33; 701/35; 455/423
(58) Field of Search ........................... 701/29, 30, 33, 701/35; 455/423; 345/156

(56) References Cited

U.S. PATENT DOCUMENTS

| | | | | |
|---|---|---|---|---|
| 4,989,146 A | * | 1/1991 | Imajo | 701/35 |
| 5,400,018 A | * | 3/1995 | Scholl et al. | 340/10.3 |
| 5,442,553 A | * | 8/1995 | Parrillo | 455/420 |
| 6,330,497 B1 | * | 12/2001 | Obradovich et al. | 701/1 |
| 6,513,368 B2 | * | 2/2003 | Bondarowicz et al. | 73/53.05 |
| 6,580,983 B2 | * | 6/2003 | Laguer-Diaz et al. | 701/35 |
| 6,594,579 B1 | * | 7/2003 | Lowrey et al. | 701/123 |
| 6,611,740 B2 | * | 8/2003 | Lowrey et al. | 701/29 |

FOREIGN PATENT DOCUMENTS

| | | | | |
|---|---|---|---|---|
| KR | 1998-069321 | | 10/1998 | G08G/1/127 |
| KR | 1998-069324 | | 10/1998 | B60S/5/00 |

OTHER PUBLICATIONS

Sarma R. Vishnubhotla, et al.; A Centralized MultiProcessor–Based Control to Optimize Performance in Vehicles; 1988 IEEE; p. 52–56.

Hubert Weisser, et al.; Autonomous Driving on Vehicle Test Tracks: Overview, Implementation and vehicle Diagnosis; 1999 IEEE; p. 62–67.

* cited by examiner

*Primary Examiner*—Tan Q. Nguyen
(74) *Attorney, Agent, or Firm*—Piper Rudnick LLP

(57) ABSTRACT

A system for executing diagnosis of vehicle performance using satellite telemetry technology includes a diagnostic unit for compiling telemetry data, transmitted in real-time, of an engine and various parts of a vehicle, comparing the telemetry data with specific values of the engine and various parts to determine if there are any abnormalities in vehicle performance, and monitoring diagnostic results of vehicle performance; and a communications unit for performing communications in real-time through a network with an external user requesting vehicle performance diagnostic results of the diagnostic unit. Accordingly, the driver or external user may easily determine if there are abnormalities in vehicle performance, take steps to cope with vehicle malfunctions before they occur, and know the precise location of any abnormal areas of vehicle performance.

11 Claims, 4 Drawing Sheets

SYSTEM AND METHOD FOR EXECUTING DIAGNOSIS OF VEHICLE PERFORMANCE

BACKGROUND OF THE INVENTION (a) Field of the Invention

The present invention relates to a system and method for executing diagnosis of vehicle performance. More particularly, the present invention relates to a system and method for a vehicle for enhancing vehicle performance reliability, in which diagnosis and monitoring of vehicle performance is executed in real-time using satellite telemetry technology.

(b) Description of the Related Art

There are a variety of systems for controlling a vehicle and performing diagnosis of the same, in which microprocessors or satellite communications are used to carry out these functions. That is, through the use of a microprocessor or satellite communications, control of a vehicle and diagnosis of the same are performed without direction operation and examination of the vehicle by the driver or a service technician.

In the case of a freight vehicle, a system using a microprocessor for controlling the freight vehicle and performing diagnosis of the same executes diagnosis of parameter values. That is, vehicle states are divided into dynamic and static parameters, and these values are then determined by the system. The vehicle is maintained in an optimal condition using the obtained values. Also, this information is stored in a memory of the system and used when repairs are needed.

Since such a system for freight vehicles must perform control and diagnosis differently according to vehicle type, freight vehicles must be classified into different types by size, various parameters must be defined to determine system structures for each vehicle type, and control and diagnostic programs need to be individually installed. As a result, the realization of such a system is extremely complicated.

Further, the parameter values defined to perform control and diagnosis are combined, and this value is used to perform diagnosis, as well as real-time dynamic and static control. As a result, a significant amount of time is required by the microprocessor to perform its calculations.

In the case of the automobile, on the other hand, a system for performing malfunction processing for an automobile using satellite communications includes a GPS (global positioning system) transmitter/receiver that uses satellite communications to enable the transmission and reception of data between the system and a supercomputer of a traffic bureau; a sensor unit for detecting various malfunctions of the vehicle, performing conversion into electric signals when a positive detection of a malfunction is made; diagnostic switches for performing a diagnosis of the vehicle; a satellite communications switch for performing satellite communications; a call switch; a controller; and a display.

In the above system for automobiles, after performing diagnosis of the vehicle and determining that there is a malfunction, the area of the malfunction and method of repair are provided from the system itself to enable self-repair by the driver in the case where the malfunction is simple. On the other hand, if the malfunction is somewhat more complicated, the system provides this information of the area of malfunction and method of repair through the traffic bureau and satellite communications. Finally, in the case where a serious malfunction is detected, the system provides the necessary information so that the driver can request the assistance of a tow truck.

However, in the system for performing malfunction processing for an automobile using satellite communications, since satellite communications are performed with a supercomputer of a traffic bureau, various communications equipment is required. Further, the system does not perform an ongoing check of automobile performance to anticipate potential malfunctions.

Accordingly, the conventional system for controlling vehicles and performing diagnosis of the same is complicated and encounters problems during application (i.e., slow process speeds). Most important, the prior art system checks only present states to determine if there is a malfunction, and does not check changes in states to determine if there is a potential for a malfunction. That is, the conventional system does not perform what would be a highly beneficial function of alerting the driver to potential problems in the vehicle.

SUMMARY OF THE INVENTION

The present invention has been made in an effort to solve the above problems.

It is an object of the present invention to provide a system and method for a vehicle, in which telemetry technology is used to perform automatic diagnosis of a vehicle and an appraisal of vehicle performance, and which detects vehicle malfunctions to enable easy determination of the area of malfunction and method of repair by the driver.

It is another object of the present invention to provide a system and method for a vehicle that is capable of providing information of performance of a particular, driver-selected area of the vehicle by searching telemetry data.

To achieve the above objects, the system for executing diagnosis of vehicle performance of the present invention includes a diagnostic unit for compiling telemetry data, which is transmitted in real-time, of an engine and various parts of a vehicle, comparing the telemetry data with specific designated values of the engine and various parts of the vehicle stored in the system to determine if there are any abnormalities in vehicle performance, and monitoring diagnostic results of vehicle performance.

The system also includes a communications unit for receiving through a communications network a call signal from an external user requesting vehicle performance diagnostic results of the diagnostic unit, and transmitting through the communications network performance diagnostic results in real time according to the call signal sent by the external user.

The system is connected to a computer to enable real-time communications through a communications unit of vehicle performance or safety states, and any additional information of the vehicle between a user external to the vehicle and the driver in the vehicle.

The diagnostic unit includes telemetry sensors installed in the engine and at various desired parts of the vehicle, the telemetry sensors generating input or measured/detected information as telemetry data then outputting the same; a controller receiving the telemetry data from the telemetry sensors, comparing values of the received data with specific designated values for the engine and various parts of the vehicle to determine if vehicle performance is normal or abnormal, and converting data of results of this diagnosis or of the diagnostic process itself into function control signals and outputting the same; and a display for receiving the function control signals from the controller and performing corresponding display as requested by the driver.

The controller includes a database for compiling and storing the telemetry data received from the telemetry sensors.

The function control signals of the controller include signals for providing various information to the user, that is, a function for providing notification of normal and abnormal states of vehicle performance, a function for displaying analysis results of vehicle malfunction states, a function for displaying assessment procedures for vehicle performance, a function for explaining each assessment procedure for vehicle performance that is displayed, a function for providing a warning with respect to a critical situation of vehicle performance, a function for adding new functions, and a function for providing additional information of vehicle states.

The display uses graphical user interface (GUI) technology through which the user interfaces with the system.

The controller includes a data processor for performing conversion of the telemetry data transmitted in real-time from the telemetry sensors into data that can represent vehicle states; a data search unit, which uses the vehicle state data converted by the data processor to perform procedures to assess vehicle performance for performing analysis of normal/abnormal states of vehicle performance; and a data diagnostic unit for confirming an abnormal state of vehicle performance according to analysis results of the data search unit, displaying abnormal states of vehicle performance, and processing results of vehicle performance assessment procedures.

The method for executing diagnosis of vehicle performance includes (a) compiling telemetry data, which is transmitted in real-time, of an engine and various parts of a vehicle; and (b) comparing the telemetry data with specific designated values of the engine and various parts of the vehicle stored in the system to perform diagnosis of normal/abnormal states of vehicle performance, and monitoring diagnostic results of vehicle performance.

The method further includes (c) transmitting additional information of the vehicle including diagnostic information of vehicle performance when an external makes a data communications request through a communications network.

Step (b) includes (i) processing the telemetry data into data that can represent vehicle states; (ii) comparing the converted vehicle state data with the specific designated values of the engine and various parts of the vehicle to perform assessment procedures of vehicle performance; (iii) performing diagnosis of normal/abnormal states of vehicle performance according to the assessment of vehicle performance of step (ii), and generating function control signals with respect to diagnostic results; and (iv) receiving the function control signals of step (iii) and displaying vehicle performance diagnostic procedures and diagnostic results as requested by the user.

The vehicle performance assessment procedures of step (ii) include a procedure, since the telemetry data vary with time, of analyzing vehicle performance trends using the vehicle state data.

In step (iii), the function control signals include data for analyzing and controlling malfunction states of the vehicle, data for analyzing abnormal states of vehicle performance, data for displaying assessment procedures for vehicle performance to the user, data for explaining each assessment procedure for vehicle performance as requested by the user, data for controlling a warning when the vehicle performance encounters a critical situation, data for adding new functions, and data including additional information of vehicle states.

In step (c), the diagnostic result of vehicle performance are transmitted via a communications network to a vehicle maintenance facility to allow checking of vehicle states, and to receive vehicle maintenance services including repair information.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
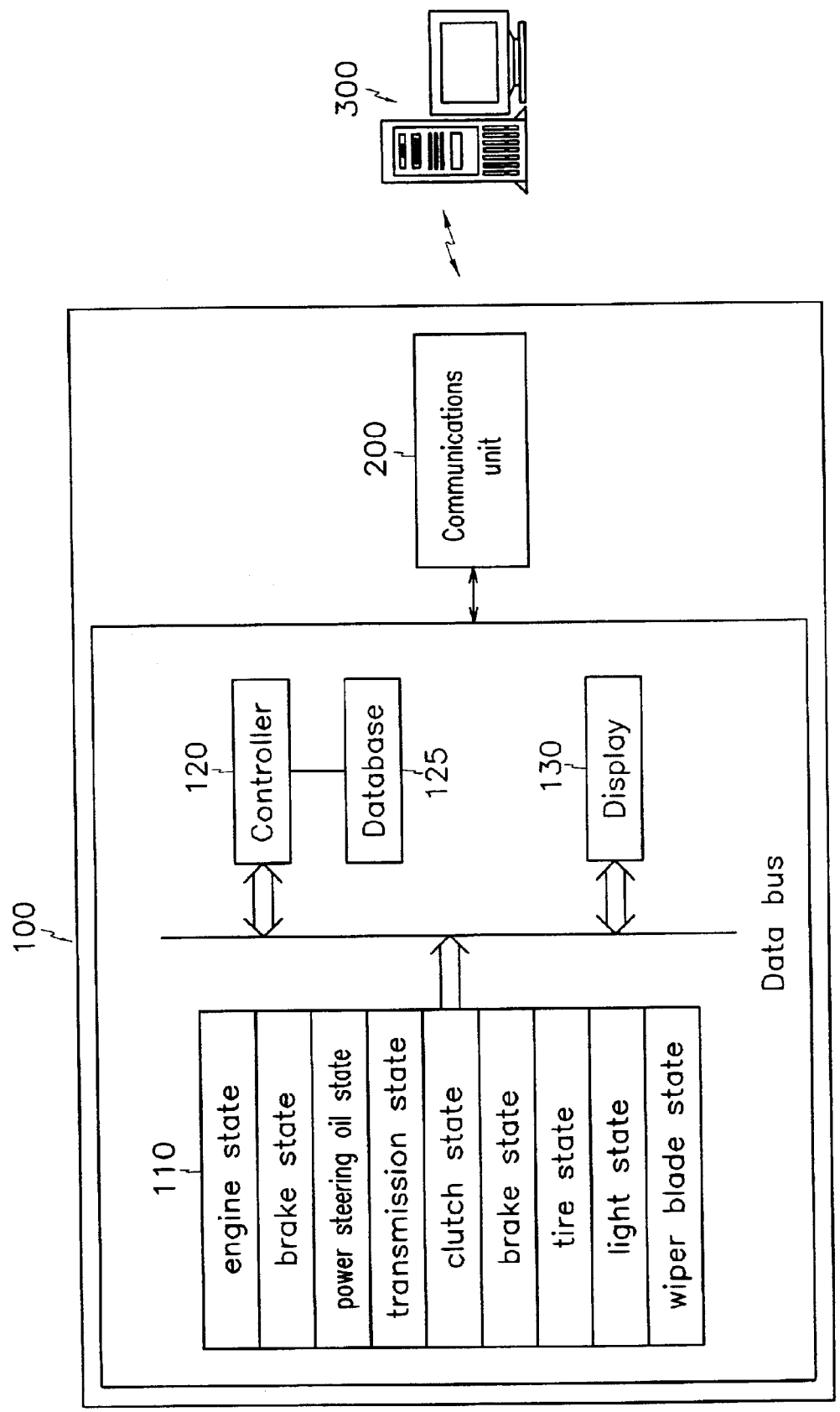
FIG. 1 is a block diagram of a system for executing diagnosis of vehicle performance according to a preferred embodiment of the present invention.

FIG. 1 is a block diagram of a system for performing diagnosis of vehicle performance according to a preferred embodiment of the present invention.

As shown in FIG. 1, a system for performing diagnosis of vehicle performance according to a preferred embodiment of the present invention includes a diagnostic unit 100, which compiles telemetry data, which is transmitted in real-time, of the engine and various parts of the vehicle, and compares stored values of the engine and various parts of the vehicle with the incoming telemetry data to determine if the vehicle is experiencing a malfunction and perform general vehicle monitoring.

The system also includes a communications unit 200 that receives, via a communications network, a call signal from an external user requesting vehicle performance diagnostic results of the diagnostic unit 100. When such a call signal is received, the communications unit 200 transmits the vehicle performance diagnostic results in real-time.

The diagnostic unit 100 is connected to a computer 300 via the communications unit 200. This enables real-time communications between the driver and an external user with respect to vehicle performance or safety states, and any additional information. The computer 300 may be provided as needed. That is, a computer 300 may be provided for all users needing diagnostic information of vehicle performance, and, in particular, may also be installed at service stations or even at traffic facilities.

The diagnostic unit 100 includes telemetry sensors 110 installed in the engine and at various desired parts of the vehicle, the telemetry sensors 110 generating input or measured/detected information as telemetry data then outputting the same; a controller 120 receiving the telemetry data from the telemetry sensors 110, comparing values of the received data with designated values for the engine and various parts of the vehicle to determine if the vehicle is operating normally or if there is a malfunction, and converting data of results of this diagnosis or of the diagnostic process itself into function control signals and outputting the same; and a display 130 for receiving the function control signals from the controller 120 and performing corresponding display as requested by the driver.

Sensors or transducers may be used as the telemetry sensors 110. The controller 120 is an on-board computer that includes an internal multiprocessor for performing the processing of the telemetry data of the telemetry sensors 110. Further, the controller 120 includes a database 125 for compiling and storing the telemetry data received from the telemetry sensors 110. When the driver or an external user designates a specific vehicle performance state, the database 125 is searched to provide the desired information.

Figure 2:
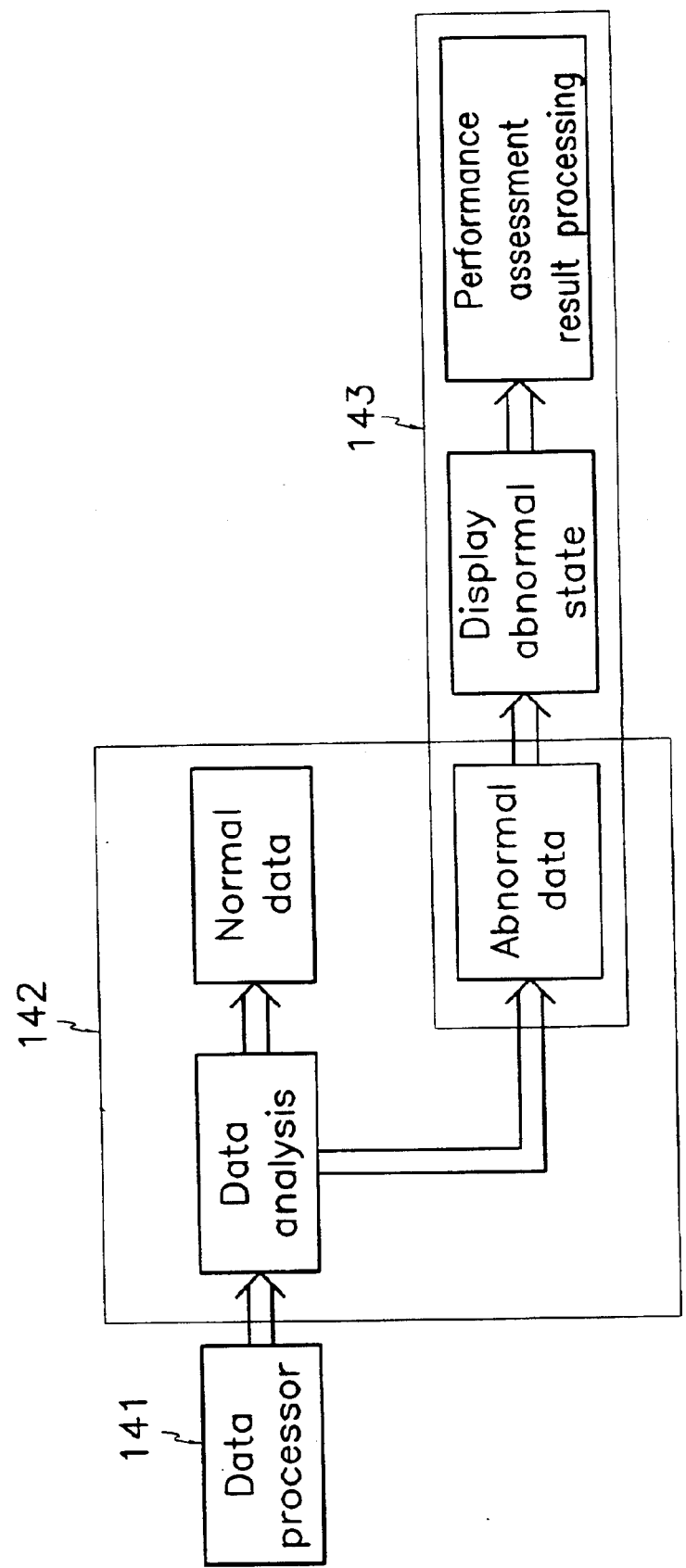
FIG. 2 is a block diagram of a controller of FIG. 1.

FIG. 2 is a block diagram of the controller 120.

As shown in the drawing, the controller 120 includes a data processor 141 for performing conversion of the telemetry data transmitted in real-time from the telemetry sensors 110 into data that can represent vehicle states; a data search unit 142, which uses the vehicle state data converted by the data processor 141 to perform procedures to assess vehicle performance for performing analysis of normal/abnormal states of vehicle performance; and a data diagnostic unit 143 for confirming an abnormal state of vehicle performance according to analysis results of the data search unit 142, displaying abnormal states of vehicle performance, and processing results of vehicle performance assessment procedures.

Figure 3:
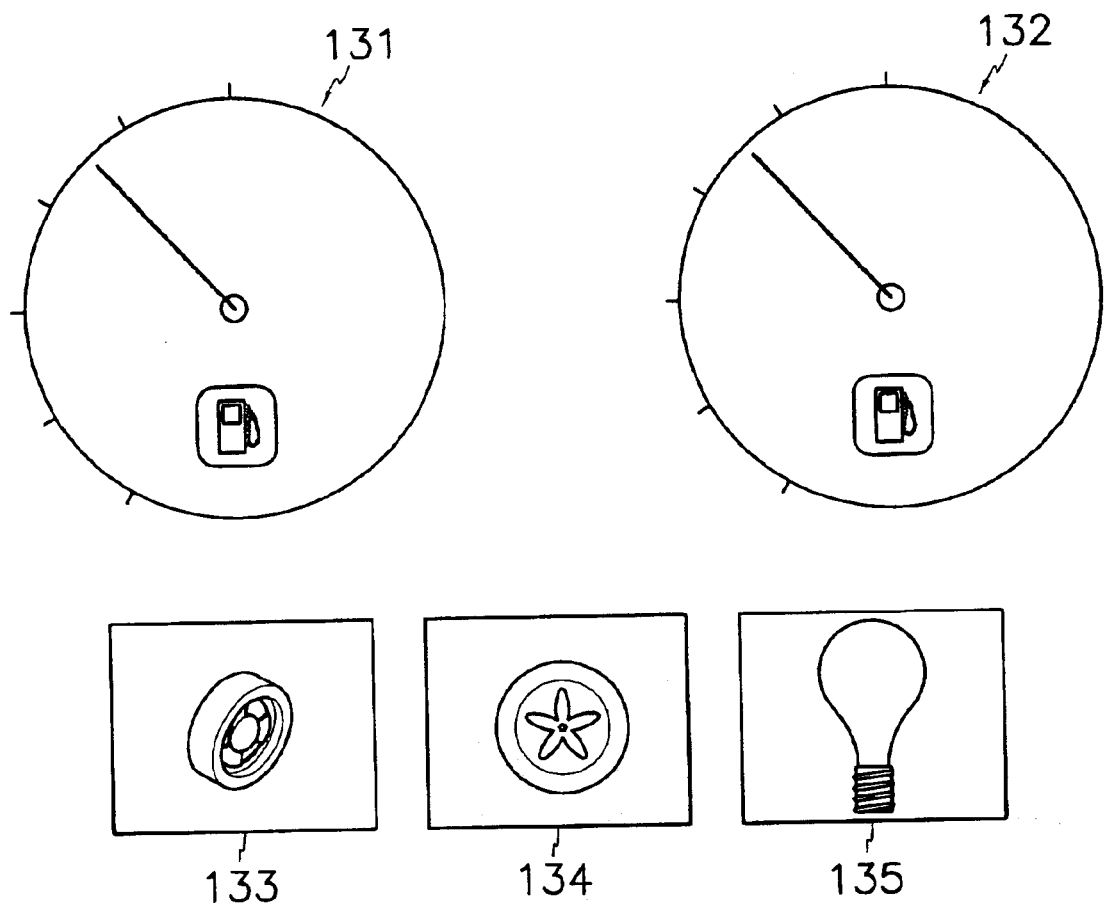
FIG. 3 is a schematic view showing various indicators appearing in a display of FIG. 1.

FIG. 3 is a schematic view showing various indicators of the display 130.

As shown in FIG. 3, a display screen of the display 130 includes an engine oil indicator 131, a brake oil indicator 132, a brake state indicator 133, a tire state indicator 134, and a light state indicator 135. The display 130 receives the function control signals from the controller 120 to perform the display of the corresponding function. The function control signals of the controller 120 include basic information provided to the data such as data for analyzing and controlling vehicle malfunction states, data analyzing vehicle performance malfunction states, data for displaying vehicle performance assessment procedures to the driver, data for explaining and providing help with respect to the vehicle performance procedures as requested by the driver, data for adding new functions, data for controlling warnings when a critical situation occurs with the vehicle, and additional information of vehicle states.

The display 130 uses graphical user interface (GUI) technology to provide convenience to the user and system automation.

An operation of the system for executing diagnosis of vehicle performance described above will now be described with reference to FIG. 4, which shows a flow chart of a method for executing diagnosis of vehicle performance according to a preferred embodiment of the present invention.

Figure 4:
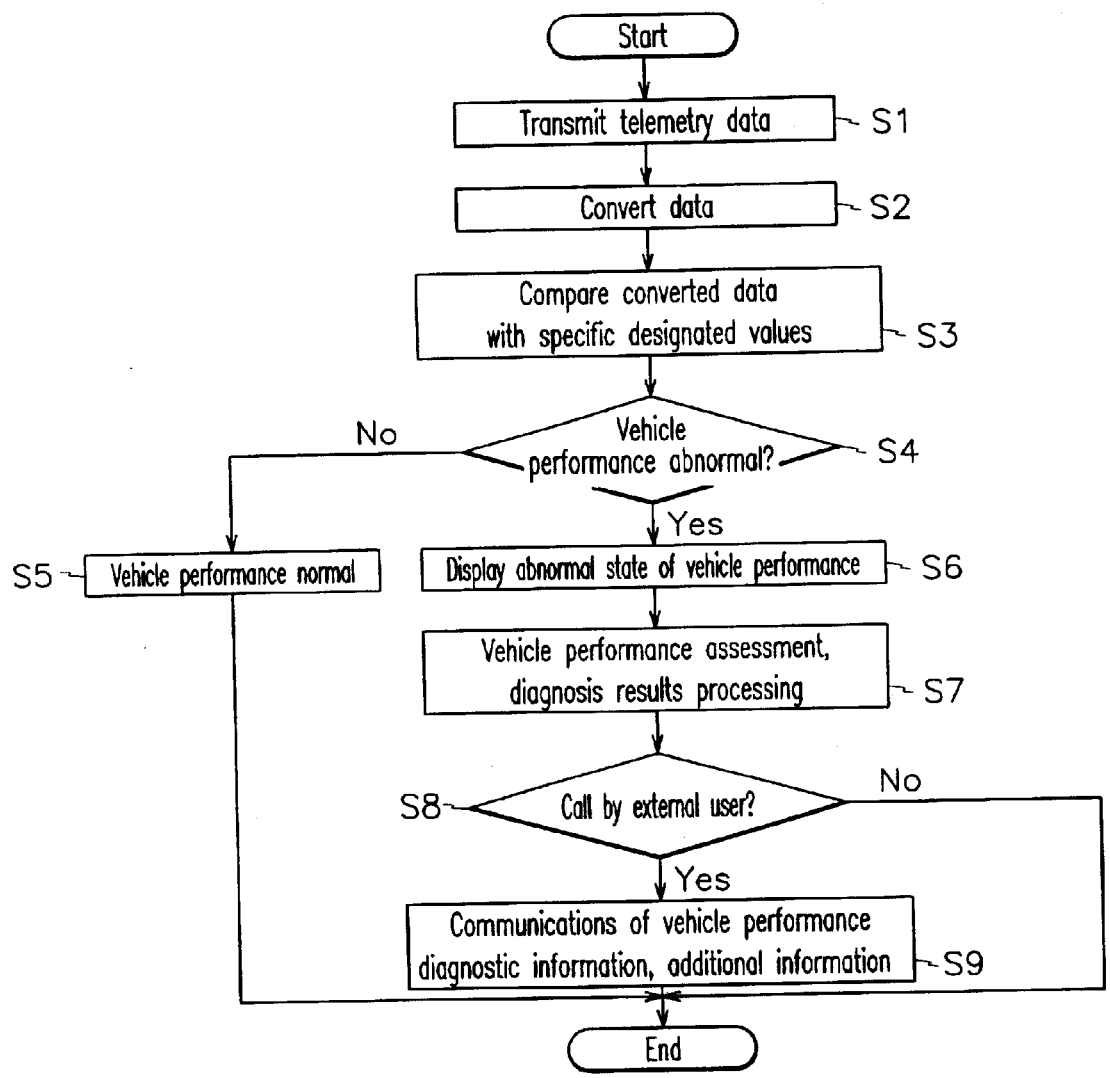
FIG. 4 is a flow chart of a method for executing diagnosis of vehicle performance according to a preferred embodiment of the present invention.

With reference to FIG. 4, input or measured/detected telemetry data of the engine and various parts of the vehicle are transmitted from the telemetry sensors 110 to the controller 120 in step S1. The telemetry data include, but are not limited to, data of engine state, brake oil state, power steering oil state, transmission state, clutch state, brake state, tire state, light state, and wiper blade state. Further, applying satellite telemetry technology and GUI technology, the telemetry data may appear as real-time, automated data showing vehicle performance assessment and diagnostic processes performed directly by a technician at an existing repair facility.

The data processor 141 of the controller 120 receives the telemetry data and performs conversion into data that can represent vehicle states in step S2. Next, in step S3, the data search unit 142 compares/analyzes the converted vehicle state data with specific designated values of the engine and various parts of the vehicle. These designated values are pre-stored in the system.

Subsequently, the data diagnostic unit 143 of the controller 120 compares the vehicle state data according to the telemetry data with the specific designated values to perform analysis of a vehicle performance normal/abnormal state in step S4. If it is determined from the analysis result that the vehicle performance is normal, the controller 120 performs control such that the display 130 shows a normal state for vehicle performance in step S5.

However, if it is determined from the analysis result that the vehicle performance is abnormal, the controller 120 performs control so that an abnormal display of the vehicle is displayed through the display 130 in step S6. Next, the controller 120 performs processing of vehicle performance assessment and diagnostic results in step S7. At this time, the controller 120 generates function control signals such that vehicle performance assessment procedures, diagnostic states, and diagnostic results are displayed on the display 130.

Further, since the telemetry data are data that vary with time with respect to vehicle performance, the controller 120 analyzes vehicle performance trends. Also, in the case where vehicle performance is abnormal, the controller 120 analyzes the cause of the malfunction to provide the appropriate repair information.

In addition, the controller 120 has a Help function so that the driver or external user can view the deduction process for determining vehicle performance assessment states, and also has installed an explanation function to describe the deduction process. Accordingly, the driver or external user can easily determine vehicle performance, and can obtain precise information with respect to vehicle performance.

Furthermore, since telemetry data is continuously transmitted in real-time, the controller 120 compiles this data and stores the same in the database 125. If the driver or external user designates a specific aspect of vehicle performance, the controller 120 provides this information by searching the database 125, thereby enabling the assessment and monitoring of vehicle performance.

If a critical situation occurs with the vehicle, the controller 120 has a warning control function such that the driver is warned of the critical situation. Alternatively, a service station or traffic facility may be notified of the critical situation through the communications unit 200 depending on the situation.

The controller 120 also has enables the expansion of the system by allowing the addition of extra functions.

As described above, the controller 120 has a variety of functions for performing vehicle performance assessment and diagnosis/monitoring, and generates function control signals using these functions to enable display on the display 130 or control of a specific part of the vehicle.

If an external user transmits a call signal through the communications unit 200 so that he or she may know of vehicle performance assessment and diagnosis states/diagnosis results in step S8, the controller 120 performs communications through a communications network such that vehicle performance diagnostic information and other additional information of the vehicle is displayed on the external user's computer 300 in step S9.

If the external user is a vehicle repair facility, vehicle performance assessment and diagnostic information of the diagnostic unit 100 is displayed in real-time on the external user's computer 300. This capability is provided regardless of whether the vehicle is being operated or is parked.

Accordingly, an external user can check vehicle performance states, and if vehicle performance is abnormal, may provide vehicle maintenance services, including vehicle repair information, to the diagnostic unit 100.

In the system and method for executing diagnosis of vehicle performance of the present invention, diagnosis and assessment of vehicle performance are performed in real-time and automatically using satellite telemetry technology such that the driver or an external user may determine if there are abnormalities in vehicle performance, may take steps to cope with vehicle malfunctions before they occur, and may know the precise location of any abnormal areas of vehicle performance, thereby making the repair of malfunctions more easy.

Further, in the system and method for executing diagnosis of vehicle performance of the present invention, if the driver or an external user designates a vehicle performance state that he or she desires to know, the corresponding information is provided to the driver or external user by searching vehicle telemetry data, thereby improving driver or user confidence in vehicle performance.

In addition, in the system and method for executing diagnosis of vehicle performance of the present invention, since real-time communications with an external user is possible through the communications unit, information of vehicle performance assessment and diagnostic states may be provided to users requiring this information, and additional information of the vehicle and other service information may be received.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A system for executing diagnosis of vehicle performance of a vehicle comprising:
    a communications unit receiving through a communications network a call signal from a external user at a remote site requesting vehicle performance diagnostic results of an engine and various parts of the vehicle, and transmitting through the communication network the performance diagnostic results in real time to the external user in response to said call signal;
    telemetry sensors installed in the engine and the various parts of the vehicle, the telemetry sensors recovering the information that is input from or measured/detected at the engine and at the various parts of the vehicle to telemetry data and then outputting said telemetry data;
    a controller receiving the call signal from the communication unit to control operation of the telemetry sensors, said controller receiving the telemetry data from the telemetry sensors, comparing values of the received data with specific designated values for the engine and the various parts of the vehicle to determine if vehicle performance is normal or abnormal, and converting results data into function control signals and outputting said function control signals; and
    a display for receiving the function control signals from the controller and displaying the diagnosis process of vehicle performance or the diagnosis results as requested by a driver of the vehicle, the display including a graphical user interface (GUI) technology through the driver interfaces with the system.

2. The system as in claim 1, wherein the remote site includes a computer that is connected to said communications unit to enable real-time communications of vehicle performance or safety states, and any additional information of the vehicle between said external user and the vehicle, wherein diagnostic results received from said vehicle through said communications network are displayed on said remote site computer in real time and regardless of whether said vehicle is being operated or is parked.

3. The system of claim 1, wherein the controller includes a database for compiling and storing the telemetry data received from the telemetry sensors.

4. The system of claim 1, wherein the function control signals of the controller include signals for providing various information to the user, that is, a function for providing notification of normal and abnormal states of vehicle performance, a function for displaying analysis results of vehicle malfunction states, a function for displaying assessment procedures for vehicle performance, a function for explaining each assessment procedure for vehicle performance that is displayed, a function for providing a warning with respect to a critical situation of vehicle performance, a function for adding new functions, and a function for providing additional information of vehicle states.

5. The system of claim 1, wherein the controller comprises:
    a data processor for performing conversion of the telemetry data transmitted in real-time from the telemetry sensors into data that can represent vehicle states;
    a data search unit, which uses the vehicle state data converted by the data processor to perform procedures to assess vehicle performance for performing analysis of normal/abnormal states of vehicle performance; and
    a data diagnostic unit for confirming normal/abnormal states of vehicle performance according to analysis results of the data search unit, and processing results of vehicle performance assessment procedures.

6. A method for executing diagnosis of vehicle performance using a system for transferring data real time from a vehicle to an external user at a remote site in response to a call signal received over a communications network, the method comprising the steps of;
    (a) receiving the call signal from the external user at the remote site;
    (b) compiling telemetry data, which is transmitted in real-time, of an engine and various parts of the vehicle; and
    (c) comparing the telemetry data with specific designated values of the engine and various parts of the vehicle stored in the system to perform diagnosis of normal/abnormal states of vehicle performance, and monitoring diagnostic results of vehicle performance; and
    (d) transmitting vehicle information including diagnostic information to said external user through said communications network in real time in response to said calls signal.

7. The method of claim 6, wherein step (c) comprises:

(i) processing the telemetry data into data that can represent vehicle states;

(ii) comparing the vehicle state data processed in step (i) with the specific designated values of the engine and various parts of the vehicle to perform assessment procedures of vehicle performance;

(iii) performing diagnosis of normal/abnormal states of vehicle performance according to the assessment of vehicle performance of step (ii), and generating function control signals with respect to diagnostic results; and (iv) receiving the function control signals of step (iii) and displaying vehicle performance diagnostic procedures and diagnostic results as requested.

8. The method of claim 7, wherein the vehicle performance assessment procedures of step (ii) include a procedure, since the telemetry data vary with time, of analyzing vehicle performance trends using the vehicle state data.

9. The method of claim 7, wherein in step (iii), the function control signals include data for analyzing and controlling malfunction states of the vehicle, data for analyzing abnormal states of vehicle performance, data for displaying assessment procedures for vehicle performance to the user, data for explaining each assessment procedure for vehicle performance as requested by the user, data for controlling a warning when the vehicle performance encounters a critical situation, data for adding new functions, and data including additional information of vehicle states.

10. The method as in claim 6, wherein in step (d), the diagnostic results of vehicle performance are transmitted via the communications network to a vehicle maintenance facility to allow checking of vehicle states, and to receive vehicle maintenance services including repair information.

11. The method as in claim 6, wherein the real-time transfer of data between the vehicle an the external user occurs whether the vehicle is being operated or is parked.

\* \* \* \* \*